United States Patent
Roh et al.

(10) Patent No.: US 8,300,572 B2
(45) Date of Patent: Oct. 30, 2012

(54) METHOD AND SYSTEM FOR CONTROLLING POWER IN A COMMUNICATION SYSTEM

(75) Inventors: Kwan-Hee Roh, Hwaseong-si (KR); Jae-Hee Cho, Seoul (KR); Jeong-Ho Park, Seoul (KR); Tae-Young Kim, Seongnam-si (KR); Jin-Kyu Koo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1057 days.

(21) Appl. No.: 12/005,512

(22) Filed: Dec. 27, 2007

(65) Prior Publication Data

US 2008/0159196 A1 Jul. 3, 2008

(30) Foreign Application Priority Data

Dec. 28, 2006 (KR) .................. 10-2006-0136390

(51) Int. Cl.
*H04B 7/00* (2006.01)
(52) U.S. Cl. ...................... 370/318; 455/522
(58) Field of Classification Search .......... 370/328–338; 455/1, 422.1, 432.1, 434, 436–438, 443, 455/442, 522
See application file for complete search history.

(56) References Cited

U.S. PATENT DOCUMENTS

| | | | |
|---|---|---|---|
| 6,070,084 A * | 5/2000 | Hamabe | 455/522 |
| 6,577,875 B1 * | 6/2003 | Brouwer | 455/522 |
| 6,721,568 B1 * | 4/2004 | Gustavsson et al. | 455/450 |
| 7,590,181 B2 * | 9/2009 | Awad et al. | 375/259 |
| 7,603,134 B2 * | 10/2009 | Cho | 455/522 |
| 7,787,880 B2 * | 8/2010 | Ueda | 455/439 |
| 2003/0026219 A1 | 2/2003 | Moon et al. | |
| 2005/0036441 A1 * | 2/2005 | Laroia et al. | 370/203 |
| 2005/0105492 A1 * | 5/2005 | Simonsson et al. | 370/332 |
| 2006/0256805 A1 | 11/2006 | Cho et al. | |

FOREIGN PATENT DOCUMENTS

| | | |
|---|---|---|
| KR | 1999-0078165 | 10/1999 |
| KR | 1020010019655 A | 3/2001 |
| KR | 1020010064875 A | 7/2001 |

* cited by examiner

*Primary Examiner* — Ricky Ngo
*Assistant Examiner* — Thai Nguyen

(57) ABSTRACT

A method and system for controlling power in a communication system are provided, in which a base station calculates a power control value for an mobile station based on feedback information received from the mobile station, transmits power control information including the power control value to the mobile station, measures the strength of a signal received corresponding to the transmit power control information from the mobile station, determines the status of the mobile station using the signal strength and the power control value, and schedules the mobile station according to the determination.

32 Claims, 3 Drawing Sheets

METHOD AND SYSTEM FOR CONTROLLING POWER IN A COMMUNICATION SYSTEM

CROSS-REFERENCE TO RELATED APPLICATION(S) AND CLAIM OF PRIORITY

This application claims the benefit under 35 U.S.C. §119(a) of a Korean Patent Application filed in the Korean Intellectual Property Office on Dec. 28, 2006 and assigned Serial No. 2006-136390, the entire disclosure of which is hereby incorporated by reference.

TECHNICAL FIELD OF THE INVENTION

The present invention generally relates to a communication system. More particularly, the present invention relates to a method and system for controlling uplink power in a communication system.

BACKGROUND OF THE INVENTION

Providing services with different Quality of Service (QoS) requirements to users is an active study area for the future-generation communication system. Especially, studies are being actively conducted on supporting high-speed services by ensuring mobility and QoS to Broadband Wireless Access (BWA) communication systems such as Wireless Local Area Network (WLAN) and Wireless Metropolitan Area Network (WMAN). A major example of the BWA communication systems is Institute of Electrical and Electronics Engineers (IEEE) 802.16e.

To increase data transmission capacity and improve QoS, the future-generation communication system controls downlink and uplink transmit power such that a Base Station (BS) or a Mobile Station (MS) transmits a signal with a minimum strength enough to enable the other party to have an acceptable Signal-to-Interference and Noise Ratio (SINR) for data reception. With the power control, the BS transmits a signal with a high transmit power to an MS with a low SINR, thereby rendering data communication between them to be stable and suppressing the QoS degradation of the MS.

The power control scheme controls the transmit power of a transmitter so that a receiver can keep its SINR at an acceptable level. Particularly, an Orthogonal Frequency Division Multiplexing or Orthogonal Frequency Division Multiple Access (OFDM/OFDMA) communication system maximizes transmit power within a range that prevents mutual interference between neighbor base stations, for example, within a range where data exchanged between neighbor base stations and mobile stations serviced by the neighbor base stations do not interfere with one another, thus improving reception quality (i.e., QoS).

Meanwhile, the communication system needs to differentiate the transmit power of an MS at the center of the cell area of a serving BS and thus in a good channel status from an MS at a cell boundary area and thus in a poor channel status, in power control. For example, if the MS at the cell boundary transmits a signal with a high transmit power, the signal interferes with a neighbor BS. Hence, the MS is controlled to transmit a signal with a minimum transmit power that meets an SINR requirement for data transmission and reception in a receiver. If the MS at the center of the cell transmits a signal with a high transmit power, the signal does not interfere much with the neighbor BS. Hence, the MS is allowed to transmit a signal with a high transmit power in order to improve the QoS of transmitted and received signals. Accordingly, there exists a need for a technique for controlling the transmit power of data in a communication system.

SUMMARY OF THE INVENTION

To address the above-discussed deficiencies of the prior art, it is a primary object of the present invention is to address at least the problems and/or disadvantages and to provide at least the advantages described below. Accordingly, an aspect of exemplary embodiments of the present invention is to provide a method and system for controlling power in a communication system.

Another aspect of exemplary embodiments of the present invention is to provide a method and system for controlling uplink power in a communication system.

In accordance with an aspect of exemplary embodiments of the present invention, there is provided a method for controlling power in a BS in a communication system, in which a power control value is calculated for an MS based on feedback information received from the MS, power control information including the power control value is transmitted to the MS, the strength of a signal is measured, which is received corresponding to the transmit power control information from the MS, the status of the MS is determined using the signal strength and the power control value, and the MS is scheduled according to the determination.

In accordance with another aspect of exemplary embodiments of the present invention, there is provided a system for controlling power in a communication system, in which a BS calculates a power control value for an MS based on feedback information received from the MS, transmits power control information including the power control value to the MS, measures the strength of a signal received corresponding to the transmit power control information from the MS, determines the status of the MS using the signal strength and the power control value, and schedules the MS according to the determination.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1:
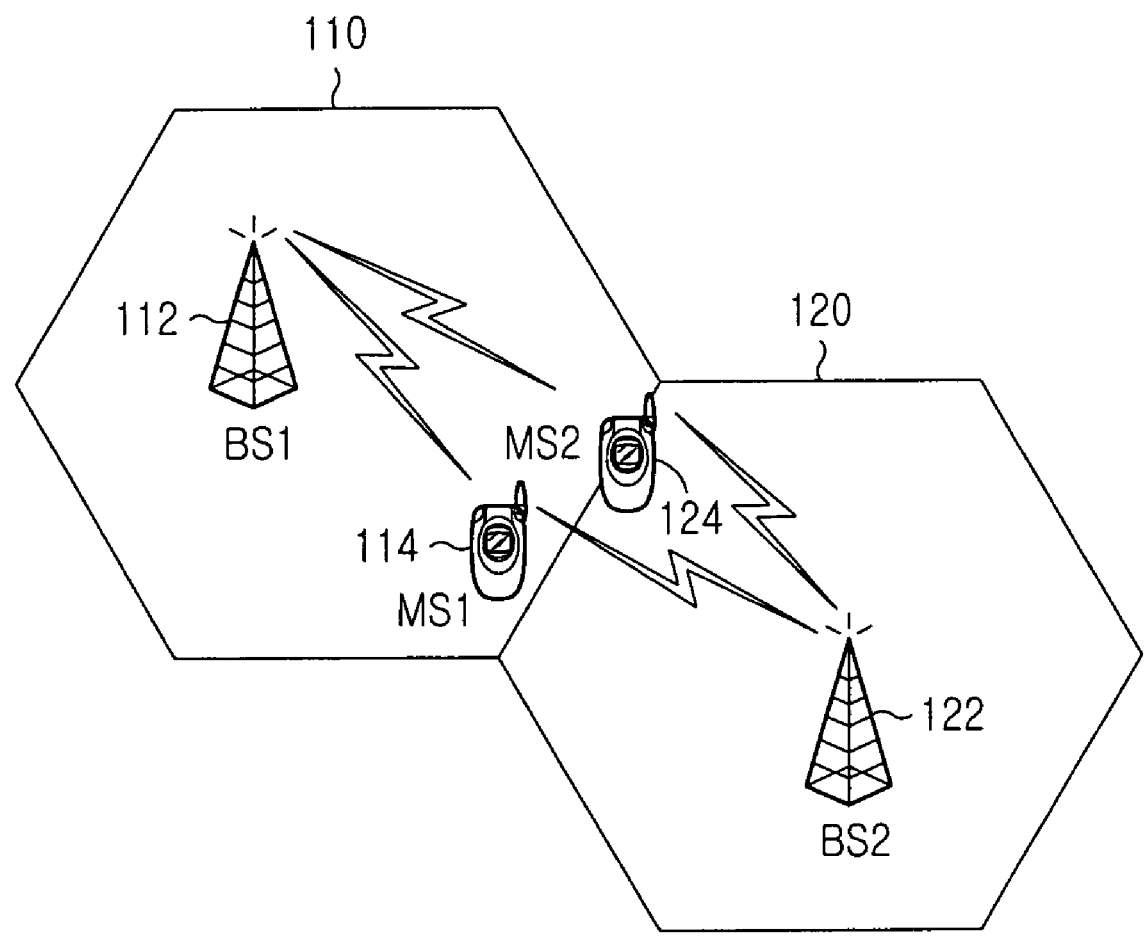
FIG. 1 illustrates the configuration of a communication system according to an exemplary embodiment of the present invention.
Figure 2:
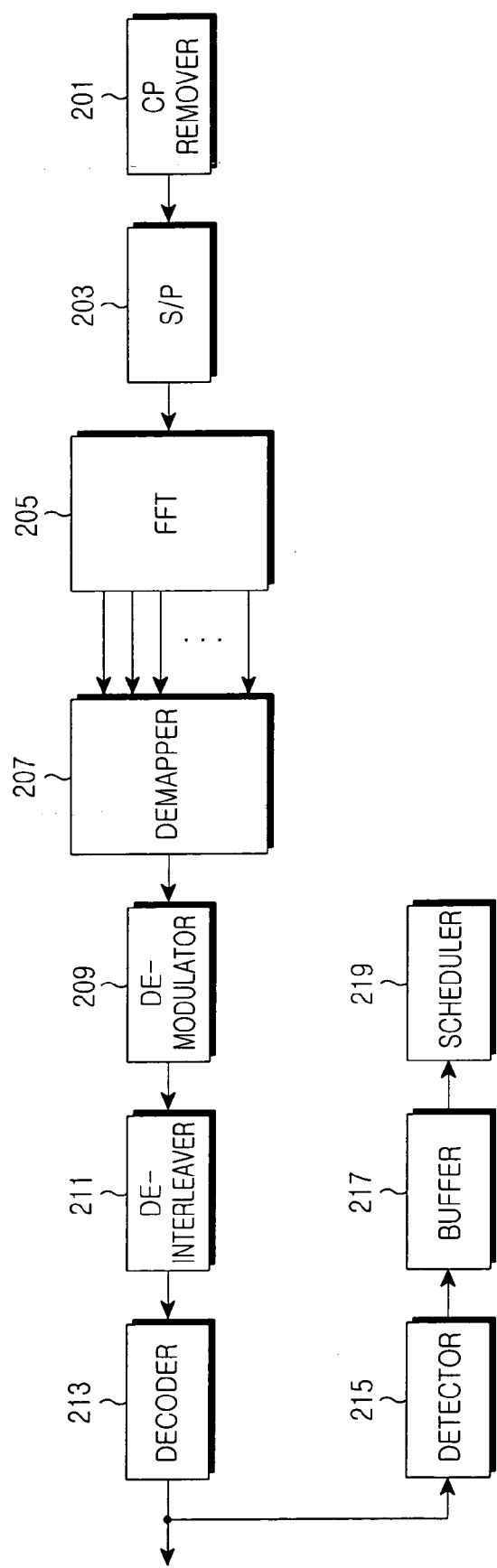
FIG. 2 is a block diagram of a BS in the communication system according to an exemplary embodiment of the present invention.
Figure 3:
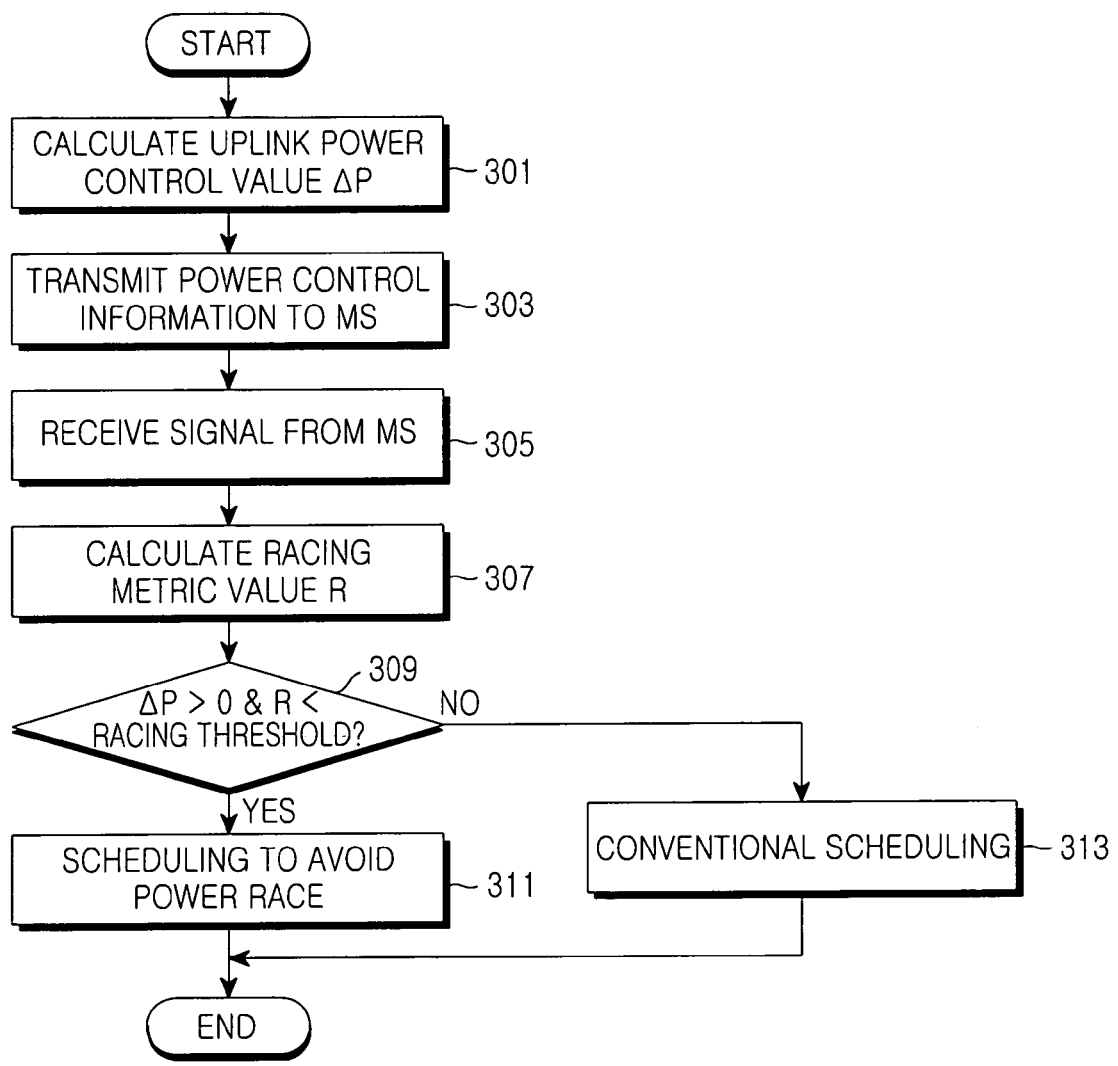
FIG. 3 is a flowchart of an operation of the BS in the communication system according to an exemplary embodiment of the present invention.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide a method and system for controlling power in a communication system, for example, an IEEE 802.16e-based BWA communication system. While the exemplary embodiments of the present invention are described in the context of an OFDM/OFDMA communication system, it is to be clearly understood that the power control method and system of the present invention are also applicable to other communication systems.

The exemplary embodiments of the present invention also provide a method and system for controlling power when a BS covering a predetermined cell transmits and receives data to and from an MS that receives a communication service from the BS within the cell in a communication system. Further, the exemplary embodiments of the present invention provide a method and system for controlling uplink power in a communication system.

With reference to FIG. 1, power control in a communication system according to an exemplary embodiment of the present invention will be described below.

FIG. 1 illustrates the configuration of a communication system according to an exemplary embodiment of the present invention.

Referring to FIG. 1, the communication system includes first cell 110 and second cell 120 (Cell1 110 and Cell2 120), first base stations 112 and second base stations 122 (BS1 112 and BS2 122) for covering Cell1 110 and Cell2 120, respectively, MS1 114 for receiving a communication service from BS1 112 within Cell1 110, and MS2 124 for receiving a communication service from BS2 122 within Cell2 120. For better understanding of the description, it is assumed that MS1 114 and MS2 124 are remote from their serving base stations, that is, at the boundaries of Cell1 110 and Cell2 112. For MS1 114, Cell1 110 is a serving cell, BS1 112 is a serving BS, Cell2 120 is a neighbor cell, and BS2 122 is a neighbor BS.

As MS1 114 and MS2 124 are located at the boundaries of Cell1 110 and Cell2 120, respectively, they transmit signals with high transmit power to BS1 112 and BS2 122, compared to mobile stations at the centers of Cell1 110 and Cell2 120. BS1 112 measures the SINR of the signal from MS1 114 and BS2 122 measures the SINR of the signal from MS2 124. MS1 114 and MS2 124 receive power control information including information about their transmit power for BS1 112 and BS2 122 and transmit the signals based on the power control information.

BS1 112 and BS2 122 calculate power control values $\Delta P$ for uplink transmission of MS1 114 and MS2 124 based on feedback information from MS1 114 and MS2 124, for example, Channel Quality Information (CQI) between BS1 112 and MS1 114 and CQI between BS2 122 and MS2 124. BS1 112 and BS2 122 then transmit the power control information including the power control values $\Delta P$ to MS1 114 and MS2 124, respectively. MS1 114 and MS2 124 control their uplink transmit power based on the power control values $\Delta P$ and transmit signals at the controlled transmit power levels. Each of BS1 112 and BS2 122 also acquires an SINR variation $\Delta SINR$ by calculating the difference between the SINR $\Delta SINR_0$ of a previous frame received from MS1 114 or MS2 124 and the SINR of a current frame received from MS1 114 or MS2 124.

BS1 112 and BS2 122 determine whether mobile stations within their cells are racing with mobile stations within neighbor cells in uplink power. When mobile stations, particularly mobile stations at the cell boundaries competitively increase their transmit power levels to improve the reception performance of their serving base stations, it is said that the mobile stations are in an uplink power race. That is, MS1 114 and MS2 124 at the cell boundaries transmit uplink signals to BS1 122 and BS2 122 with increased transmit power to improve the reception performance of BS1 112 and BS2 122.

As a result, the signal directed from MS2 124 to BS2 122 interferes with the signal from MS2 124 to BS1 112. The interference increases with the transmit power of MS2 124. Even though MS1 114 increases its transmit power to improve the reception performance of BS1 112, the signal transmitted by MS2 124 increases the interference, resulting in no improvement of the reception performance of BS1 112. Therefore, MS1 114 further increases the transmit power to improve the reception performance of BS1 112. Similarly, although MS2 124 increases its transmit power to improve the reception performance of BS2 122, the signal transmitted by MS1 114 interferes with the signal from MS2 124, impeding improvement of the reception performance of BS2 122. Thus, MS2 124 further increases the transmit power to improve the reception performance of BS2 122.

Meanwhile, BS1 112 and BS2 122 calculate racing metric values R using the power control values $\Delta P$ and the SINR variations $\Delta SINR$ and determine from the power control values $\Delta P$ and the racing metric values R whether MS1 114 and MS2 124 are racing in uplink power. The racing metric values R are computed by:

$$R = \frac{SINR_n - SINR_o}{\Delta P} = \frac{\Delta SINR}{\Delta P}. \qquad [\text{Eqn. 1}]$$

BS1 112 and BS2 122 calculate $\Delta P$, $\Delta SINR$ and R for a predetermined number of frames and accumulate them. Then, BS1 112 and BS2 122 compare the accumulated racing metric values R with a racing threshold. If the comparison indicates that MS1 114 and MS2 124 are in the uplink power race, BS1 112 and BS2 122 schedule mobile stations in the manner that avoids the uplink power race. If the comparison indicates that MS1 114 and MS2 124 are not in the uplink power race, BS1 112 and BS2 122 schedule mobile stations in a conventional manner.

When MS1 114 and MS2 124 perform a paging operation, BS1 112 and BS2 122 may determine temporarily that MS1 114 and MS2 124 are racing in uplink power. That is why BS1 112 and BS2 122 accumulate $\Delta P$, $\Delta SINR$ and R for a predetermined number of frames and accumulate them. If the accumulated racing metric values R are less than the racing threshold, BS1 112 and BS2 122 determine that MS1 114 and MS2 124 are in the uplink power race.

For avoiding the uplink power race, BS1 112 and BS2 122 schedule mobile stations by a scheduling scheme in which MS1 114 and MS2 124 transmit signals to BS1 112 and BS2 122 in different frequency bands using orthogonal radio resources, a scheduling scheme in which MS1 114 and MS2 124 transmit signals to BS1 112 and BS2 122 at different time points to reduce the collision probability of allocated resources in the time domain using a random backoff algorithm like binary exponential backoff, a scheduling scheme that reduces the number of subchannels allocated to each MS, or a scheduling scheme that changes a Modulation and Coding Scheme (MCS) level for each MS to reduce its uplink transmit power.

In accordance with the exemplary embodiment of the present invention, a BS calculates a power control value $\Delta P$ and an SINR variation $\Delta SINR$ for an MS and calculates a racing metric value R using $\Delta P$ and $\Delta SINR$. If $\Delta P$ is larger than 0, the BS compares the racing metric value R with a racing threshold set according to a communication environment and the communication system.

If the racing metric value R is less than the racing threshold, which implies that a signal transmitted from an MS within a neighbor cell interferes a signal from the MS and the resulting low reception SINR of the BS brings no increase in the SINR variation $\Delta SINR$, the BS determines that the MS is racing in uplink power. Then, the BS controls the transmit power of the MS by a scheduling scheme that avoids the uplink power race. Therefore, the power and resource use efficiency of the MS is increased.

FIG. 2 is a block diagram of a BS in the communication system according to an exemplary embodiment of the present invention.

Referring to FIG. 2, the BS includes a Cyclic Prefix (CP) remover 201 for removing a CP from data received from an MS, a Serial-to-Parallel (S/P) converter 203 for converting the serial data received from the CP remover 201 to parallel data, a Fast Fourier Transform (FFT) processor 205 for processing the parallel data by FFT, a demapper 207 for demapping the FFT data to bit streams, a demodulator 209 for demodulating the bit streams, a deinterleaver 211 for deinterleaving the demodulated data, a decoder 213 for decoding the deinterleaved data, a detector 215 for calculating power control values $\Delta P$ and racing metric values R of a predetermined number of frames based on feedback information of the MS decoded by the decoder 213, a buffer 217 for accumulating the power control values $\Delta P$ and the racing metric values R and determining whether the MS is racing in uplink power by comparing the accumulated racing metric value R with a racing threshold and a scheduler 219 for performing scheduling according to the determination result of the buffer 217.

That is, the detector 215 calculates a power control value $\Delta P$ for uplink transmission of an MS based on feedback information received from the MS, for example, a CQI between the BS and the MS, measures the SINR of a signal received from the MS, and calculates the difference $\Delta SINR$ between the $SINR_o$ of a previous frame and the $SINR_n$ of a current frame. Then, the detector 215 calculates a racing metric value R using $\Delta P$ and $\Delta SINR$ by Eqn. 1. Herein, the detector 215 calculates and repeatedly for a predetermined number of frames.

The buffer 217 accumulates the power control values $\Delta P$ and the racing metric values R received from the detector 215 and determines whether the MS is in an uplink power race by comparing the accumulates metric value with the racing threshold. If the MS is in the uplink power race, the buffer 217 provides scheduling information including information about a scheduling scheme avoiding the uplink power race to the scheduler 219. If the MS is not in the uplink power race, the buffer 217 provides scheduling information including information about a conventional scheduling scheme to the scheduler 219. Scheduling schemes for avoiding the uplink power race have been described before. The scheduler 219 performs scheduling according to the received scheduling information. Now a description will be made of an operation of the BS with reference to FIG. 3.

FIG. 3 is a flowchart of an operation of the BS in the communication system according to an exemplary embodiment of the present invention.

Referring to FIG. 3, the BS calculates a power control value $\Delta P$ for uplink transmission of an MS based on feedback information received from the MS, for example, a CQI between the BS and the MS in step 301 and transmits power control information including $\Delta P$ to the MS in step 303. In step 305, the BS receives a signal from the MS with transmit power corresponding to the power control information, measures the SINR of the signal, and calculates the difference $\Delta SINR$ between the $SINR_o$ of a previous frame and the $SINR_n$ of a current frame.

The BS calculates a racing metric value R using $\Delta P$ and $\Delta SINR$ by Eqn. 1 in step 307. When $\Delta P$ is larger than 0, which means that the MS has transmitted its uplink transmit power, the BS compares the racing metric value R with the racing threshold in step 309. If the racing metric value R is less than the racing threshold, i.e., if an increased interference from an MS within a neighbor cell decreases the reception SINR of the BS and thus the SINR variation $\Delta SINR$ is not increased, the BS proceeds to step 311, considering that the MS is racing in uplink power. In step 311, the BS controls the transmit power of the MS by scheduling that avoids the uplink power race, thereby increasing the power and resource use efficiency of the MS. Scheduling schemes for avoiding the uplink power race have been described before.

If the racing metric value R is equal to or larger than the racing threshold, the BS proceeds to step 313, considering that the MS is not racing in uplink power. In step 313, the BS performs scheduling in a conventional manner. If the MS performs a paging operation in step 309, the BS may determine temporarily that the MS is in the uplink power race. Therefore, the BS accumulates power control values $\Delta P$ and racing metric values R for a predetermined number of frames and compares the accumulated racing metric value R with the racing threshold. If the accumulated racing metric value R is less than the racing threshold, the BS goes to step 311 and if the accumulated racing metric value R is equal to or larger than the racing threshold, the BS goes to step 313.

As is apparent from the above description, a BS generates power control information for an MS within its cell based on feedback information received from the MS, measures the strength of a signal received from the MS, and determines whether the MS is racing in uplink power based on the power control information and the signal strength in the present invention. As the BS performs scheduling according to the determination, the power and resources of the MS are optimized. Therefore, the resulting increase in power and resource use efficiency and data transmission/reception rate leads to improved performance in a communication system. Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for controlling power in a base station in a communication system, comprising:
calculating a power control value for a mobile station based on feedback information received from the mobile station;
transmitting power control information including the power control value to the mobile station;
calculating a signal strength variation equal to a difference between a strength of a first signal received in a previous frame from the mobile station and a strength of a second signal received in a current frame from the mobile station, the first and second signals corresponding to the transmit power control information from the mobile station;
calculating a racing metric value of the mobile station by dividing the signal strength variation by the power control value;
determining a status of the mobile station by comparing the racing metric value with a racing threshold; and
scheduling the mobile station according to the determination.

2. The method of claim 1, further comprising:
measuring the strength of a first signal received in a previous frame from the mobile station; and
measuring the strength of a second signal received in a current frame from the mobile station.

3. The method of claim 2, wherein the signal strengths are measuring the signal-to-interference and noise ratios of the received signals from the mobile station.

4. The method of claim 2, wherein the status determination comprises:
accumulating calculated racing metric values repeatedly for a predetermined number of frames; and
determining the status of the mobile station by comparing the accumulated racing metric value with the racing threshold.

5. The method of claim 4, wherein the status determination comprises determining whether the mobile station is in an uplink power race.

6. The method of claim 5, wherein the scheduling comprises, if the mobile station is in an uplink power race, scheduling the mobile station in an uplink power race-avoiding manner so that the mobile station does not race in uplink power with a second mobile station within a cell neighboring to a cell covered by the base station.

7. The method of claim 6, wherein the scheduling of the mobile station in an uplink power race-avoiding manner comprises scheduling the mobile station so that the mobile station and the second mobile station within the neighbor cell transmit signals in different frequency bands.

8. The method of claim 6, wherein the scheduling of the mobile station in an uplink power race-avoiding manner comprises scheduling the mobile station so that the mobile station and the second mobile station within the neighbor cell transmit signals at different time points.

9. The method of claim 6, wherein the scheduling of the mobile station in an uplink power race-avoiding manner comprises scheduling the mobile station so as to reduce the number of subchannels allocated the mobile station and the second mobile station within the neighbor cell.

10. The method of claim 6, wherein the scheduling of the mobile station in an uplink power race-avoiding manner comprises scheduling the mobile station by changing modulation and coding scheme (MCS) levels of the mobile station and the second mobile station within the neighbor cell.

11. The method of claim 1, wherein the status determination comprises determining whether the mobile station is in an uplink power race.

12. The method of claim 11, wherein the scheduling comprises, if the mobile station is in an uplink power race, scheduling the mobile station in an uplink power race-avoiding manner so that the mobile station does not race in uplink power with a second mobile station within a cell neighboring to a cell covered by the base station.

13. The method of claim 12, wherein the scheduling of the mobile station in an uplink power race-avoiding manner comprises scheduling the mobile station so that the mobile station and the second mobile station within the neighbor cell transmit signals in different frequency bands.

14. The method of claim 12, wherein the scheduling of the mobile station in an uplink power race-avoiding manner comprises scheduling the mobile station so that the mobile station and the second mobile station within the neighbor cell transmit signals at different time points.

15. The method of claim 12, wherein the scheduling of the mobile station in an uplink power race-avoiding manner comprises scheduling the mobile station so as to reduce the number of subchannels allocated the mobile station and the second mobile station within the neighbor cell.

16. The method of claim 12, wherein the scheduling of the mobile station in an uplink power race-avoiding manner comprises scheduling the mobile station by changing modulation and coding scheme (MCS) levels of the mobile station and the second mobile station within the neighbor cell.

17. A system for controlling power in a communication system, comprising:
a base station configured to:
calculate a power control value for a mobile station based on feedback information received from the mobile station;
transmit power control information including the power control value to the mobile station;
calculate a signal strength variation equal to a difference between a strength of a first signal received in a previous frame from the mobile station and a strength of a second signal received in a current frame from the mobile station, the first and second signals corresponding to the transmit power control information from the mobile station;
calculate a racing metric value of the mobile station by dividing the signal strength variation by the power control value;
determine a status of the mobile station by comparing the racing metric value with a racing threshold; and
schedule the mobile station according to the determination.

18. The system of claim 17, wherein the base station measures a strength of a first signal received in a previous frame from the mobile station, and measures a strength of a second signal received in a current frame from the mobile station.

19. The system of claim 18, wherein the signal strengths are measuring the Signal-to-Interference and Noise Ratios (SINRs) of the received signals from the mobile station.

20. The system of claim 18, wherein the base station accumulates calculated racing metric values repeatedly for a predetermined number of frames, and determines the status of the mobile station by comparing the accumulated racing metric value with the racing threshold.

21. The system of claim 20, wherein the base station determines whether the mobile station is in an uplink power race.

22. The system of claim 21, wherein if the mobile station is in an uplink power race, the base station schedules the mobile station in an uplink power race-avoiding manner so that the mobile station does not race in uplink power with a second mobile station within a cell neighboring to a cell covered by the base station.

23. The system of claim 22, wherein the base station schedules the mobile station so that the mobile station and the second mobile station within the neighbor cell transmit signals in different frequency bands.

24. The system of claim 22, wherein the base station schedules the mobile station so that the mobile station and the second mobile station within the neighbor cell transmit signals at different time points.

25. The system of claim 22, wherein the base station schedules the mobile station so as to reduce the number of subchannels allocated the mobile station and the second mobile station within the neighbor cell.

26. The system of claim 22, wherein the base station schedules the mobile station by changing modulation and coding scheme (MCS) levels of the mobile station and the second mobile station within the neighbor cell.

27. The system of claim 17, wherein the base station determines whether the mobile station is in an uplink power race.

28. The system of claim 27, wherein if the mobile station is in an uplink power race, the base station schedules the mobile station in an uplink power race-avoiding manner so that the mobile station does not race in uplink power with a second mobile station within a cell neighboring to a cell covered by the base station.

29. The system of claim 28, wherein the base station schedules the mobile station so that the mobile station and the second mobile station within the neighbor cell transmit signals in different frequency bands.

30. The system of claim 28, wherein the base station schedules the mobile station so that the mobile station and the second mobile station within the neighbor cell transmit signals at different time points.

31. The system of claim 28, wherein the base station schedules the mobile station so as to reduce the number of subchannels allocated the mobile station and the second mobile station within the neighbor cell.

32. The system of claim 28, wherein the base station schedules the mobile station by changing modulation and coding scheme (MCS) levels of the mobile station and the second mobile station within the neighbor cell.

* * * * *

UNITED STATES PATENT AND TRADEMARK OFFICE
CERTIFICATE OF CORRECTION

| | |
|---|---|
| PATENT NO. | : 8,300,572 B2 |
| APPLICATION NO. | : 12/005512 |
| DATED | : October 30, 2012 |
| INVENTOR(S) | : Roh et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1186 days.

Signed and Sealed this
Twenty-sixth Day of August, 2014

Michelle K. Lee
*Deputy Director of the United States Patent and Trademark Office*